US010125821B2

(12) United States Patent
Ben Abdelounis et al.

(10) Patent No.: US 10,125,821 B2
(45) Date of Patent: Nov. 13, 2018

(54) LUBRICATED ROLLING BEARING FOR BLADE ROOTS

(71) Applicant: NTN-SNR ROULEMENTS, Annecy (FR)

(72) Inventors: Houcine Ben Abdelounis, Lyons (FR); Eric Gard, Genay (FR)

(73) Assignee: NTN-SNR ROULEMENTS, Annecy (FR)

( * ) Notice: Subject to any disclaimer, the term of this patent is extended or adjusted under 35 U.S.C. 154(b) by 9 days.

(21) Appl. No.: 15/377,526

(22) Filed: Dec. 13, 2016

(65) Prior Publication Data

US 2017/0175814 A1 Jun. 22, 2017

(30) Foreign Application Priority Data

Dec. 17, 2015 (FR) ...................................... 15 62656

(51) Int. Cl.
*F16C 33/66* (2006.01)
*F16C 33/62* (2006.01)
(Continued)

(52) U.S. Cl.
CPC .............. *F16C 33/62* (2013.01); *B64C 11/32* (2013.01); *C10M 103/06* (2013.01); *C10M 105/04* (2013.01); *F16C 19/361* (2013.01); *F16C 19/38* (2013.01); *F16C 19/386* (2013.01); *F16C 19/505* (2013.01); *F16C 33/32* (2013.01); *F16C 33/34* (2013.01); *F16C 33/6633* (2013.01); *F16C 33/6696* (2013.01); *C10M 2201/0653* (2013.01); *C10M 2203/024* (2013.01); *C10N 2240/02* (2013.01); *C10N 2250/08* (2013.01); *F16C 25/06* (2013.01); *F16C 33/366* (2013.01); *F16C 33/586* (2013.01); *F16C 33/60* (2013.01); *F16C 35/06* (2013.01);
(Continued)

(58) Field of Classification Search
CPC ...... F16C 19/18; F16C 19/181; F16C 19/182; F16C 19/183; F16C 19/184; F16C 19/186; F16C 19/38; F16C 19/383; F16C 19/385; F16C 19/386; F16C 19/388; F16C 33/58; F16C 33/583; F16C 33/585; F16C 33/586; F16C 33/60; F16C 33/62; F16C 33/6633; F16C 33/6696; F16C 33/7879; F16C 33/7883; F16C 2326/43; B64C 11/32; C10M 103/00; C10M 103/02; C10M 103/04; C10M 103/06; C10N 2240/02; C10N 2250/08
See application file for complete search history.

(56) References Cited

U.S. PATENT DOCUMENTS 2,969,264 A * 1/1961 Lamson .............. F16C 33/6696
384/463
3,843,962 A * 10/1974 Bogue .................... F16C 33/30
384/463
(Continued)

FOREIGN PATENT DOCUMENTS

EP 0822137 A2 * 2/1998 ............. B64C 11/06
EP 2 749 781 A1 7/2014
(Continued)

*Primary Examiner* — Phillip A Johnson
(74) *Attorney, Agent, or Firm* — Young & Thompson

(57) ABSTRACT

The invention relates to a lubricated rolling bearing for blade roots including a coating made of a chemical compound of lamellar structure.

17 Claims, 3 Drawing Sheets

(51) Int. Cl.
   *B64C 11/32* (2006.01)
   *C10M 103/06* (2006.01)
   *C10M 105/04* (2006.01)
   *F16C 19/36* (2006.01)
   *F16C 19/38* (2006.01)
   *F16C 33/32* (2006.01)
   *F16C 33/34* (2006.01)
   *F16C 19/50* (2006.01)
   *F16C 35/06* (2006.01)
   *F16C 25/06* (2006.01)
   *F16C 33/36* (2006.01)
   *F16C 33/58* (2006.01)
   *F16C 33/60* (2006.01)

(52) U.S. Cl.
   CPC ...... *F16C 2210/00* (2013.01); *F16C 2240/60* (2013.01); *F16C 2326/43* (2013.01)

(56) References Cited

U.S. PATENT DOCUMENTS

| | | | |
|---|---|---|---|
| 8,157,453 B2* | 4/2012 | Ohtsuki | B60B 27/00 384/574 |
| 2003/0063825 A1* | 4/2003 | Ooitsu | F16C 19/163 384/527 |
| 2003/0185478 A1* | 10/2003 | Doll | C23C 14/027 384/492 |
| 2004/0228558 A1* | 11/2004 | Cha | F16C 33/7883 384/486 |
| 2008/0304783 A1* | 12/2008 | Doll | F16C 19/52 384/565 |
| 2010/0178004 A1* | 7/2010 | Tsujimoto | F16C 19/386 384/564 |
| 2014/0321776 A1* | 10/2014 | Hosoya | C10M 103/00 384/13 |
| 2015/0060208 A1* | 3/2015 | Strandell | F16C 33/664 184/14 |

FOREIGN PATENT DOCUMENTS

| | | |
|---|---|---|
| FR | 2 817 233 A1 | 5/2002 |
| FR | 2 862 609 A1 | 5/2005 |
| GB | 2 192 943 A | 1/1988 |
| GB | 2 372 297 B | 6/2004 |
| GB | 2 409 708 B | 6/2008 |

* cited by examiner

LUBRICATED ROLLING BEARING FOR BLADE ROOTS

FIELD OF THE INVENTION

The invention relates to the field of rolling bearings for blade roots, in particular rolling bearings for blade roots comprising a coating made of a chemical compound of lamellar structure and a lubricant.

BACKGROUND OF THE INVENTION

A standard rolling bearing comprises an inner ring fixed to a shaft, and a concentric outer ring, between which a race is formed. Rolling elements are positioned in this race. Conventionally, the outer ring is stationary and the inner ring turns, the opposite assembly being possible. The rolling elements have a very small contact with the inner and outer rings in order to rub the least amount possible and to limit heat buildup.

As described in the application EP 2 749 781 the rolling bearing also comprises a lubricant, generally a grease or an oil. The lubrication is an essential element for the correct functioning of the rolling bearing. 70% of the failures of bearings are due to lubrication problems. The purpose of lubrication is to insert a lubricant film (referred to as an oil film) between the rolling elements and the race, in order to limit metal-metal contact, heat buildup, wear and seizing of the elements in contact. The lubricant may also provide protection against oxidation and external pollution.

The rolling bearing for blade roots is one of the various existing bearings used in the aeronautical field. Applications FR 2 862 609 and FR 2 817 233 describe such a bearing.

This rolling bearing is used to orient the blades of a propeller engine, on the basis of the flight phase (takeoff, cruising, landing, etc.). It is positioned in an off-centered manner with respect to the axis of rotation of the engine rotor and turns constantly about the axis of rotation of the rotor. Due to this off-centered position with respect to the axis of rotation of the rotor, the rolling bearing for blade roots is subjected to a large centrifugal force and to high applied stresses. The centrifugal force and the high applied stresses will subject the rolling bearing for blade roots to a high contact pressure, of the order of 3 GPa.

The blade itself is slowly oriented about its longitudinal axis over a low angular range (−30°; +90°) by means of the inner ring and the outer ring of the rolling bearing. Although the relative movement of the two rings is limited, the vibrations make the two rings oscillate continuously with very small displacements generating oscillating conditions.

This high contact pressure and the oscillating conditions result in the lubricant contained in the rolling bearing being driven out of the contact zones. Furthermore, the centrifugal stresses applied to the rolling bearing result in the lubricant being projected outward from the rolling bearing particularly over the high temperature operating range. These projections lead to a loss of lubrication and consequently the deterioration of the rolling bearing for blade roots and the reduction in the service life thereof.

In addition to this high contact pressure and oscillating conditions, the rolling bearing for blade roots is subjected to a large temperature range that may extend from −55° C. (external temperature at altitude) to +170° C. (due to the location close to the engine). The rolling bearing for blade roots must be lubricated over this broad temperature range.

The rolling bearing must therefore be lubricated over a broad temperature range under severe conditions that combine an imposed contact pressure and oscillating conditions. These conditions are antinomic since in order for the rolling bearing to be well lubricated, it is necessary for the lubricant to be able to resupply the contact over the entire temperature operating range, without solidifying at the minimum temperatures nor being expelled at the maximum temperatures under the effect of the centrifugal stresses. On the other hand, in order to withstand the contact pressure and the centrifugal stresses, the lubricant should be as viscous as possible even at the high temperatures encountered during the engine regimes that generate the greatest centrifugation stresses.

Surprisingly, the Applicant has found a complex tribological system that makes it possible to optimize the functioning of a rolling bearing for blade roots. This complex tribological system uses a rolling bearing for blade roots comprising a coating made of a chemical compound of lamellar structure and a lubricant. Specifically, the combination of the coating made of a chemical compound of lamellar structure and of the lubricant enables the rolling bearing for blade roots to be lubricated despite the high contact pressure and the oscillations, for the broad range of temperatures to which it is subjected.

Thus, one object of the invention is, according to a first aspect, a rolling bearing for blade roots extending along a longitudinal direction between a proximal end and a distal end,
the rolling bearing for blade roots comprising:
  an outer ring having an inner surface and an outer surface opposite to the inner surface, the inner surface of the outer ring having an outer race,
  an inner ring having an inner surface and an outer surface opposite to the inner surface, the outer surface of the inner ring having an inner race,
  a single internal space being defined between the inner surface of the outer ring and the outer surface of the inner ring, the single internal space extending between a proximal end where it is closed off by a proximal sealing system between the outer ring and the inner ring and a distal end where it is closed off by a distal sealing system between the outer ring and the inner ring, said single internal space containing a lubricant,
  a row of rolling elements having a contact surface mounted in the single internal space, rolling on the outer and inner races,
and characterized in that at least one of the races and/or the contact surface of the rolling elements is (are) coated with a coating made of a chemical compound of lamellar structure.

The invention also relates to a rolling bearing for blade roots extending along a longitudinal direction between a proximal end and a distal end, the rolling bearing allowing an oscillation of the root about an axis extending along the longitudinal direction relative to a housing,
the rolling bearing for blade roots comprising:
  a single outer ring having an inner surface and an outer surface opposite to the inner surface, the inner surface of the outer ring having a proximal first outer race and a distal second outer race, the first and second outer races being offset relative to one another along the longitudinal direction,
  a first inner ring having an inner surface and an outer surface opposite to the inner surface, the outer surface of the first inner ring having a proximal first inner race and a distal seat, the first inner race and the seat being offset relative to one another along the longitudinal direction, a second inner ring having an inner surface and an outer surface opposite to the inner surface, the outer surface of the second inner ring having a distal second inner race, the second inner ring being fixed to the seat and being maintained axially in abutment against the first inner ring, a single internal space being defined between the inner surface of the outer ring and the outer surface of the first and second inner rings, the single internal space extending between a proximal end where it is closed off by a proximal sealing system between the outer ring and the first inner ring and a distal end where it is closed off by a distal sealing system between the outer ring and the second inner ring, said single internal space containing a lubricant, a proximal first row of rolling elements having a contact surface mounted in the single internal space, rolling on the proximal first outer and inner races and a distal second row of rolling elements having a contact surface mounted in the single internal space, rolling on the distal second outer and inner races, the first and second rows of rolling elements being spaced apart from one another along the longitudinal axis, the inner surface of the first inner ring comprising a shoulder for assembly to a blade root, the outer surface of the single outer ring comprising a shoulder for assembly to a housing, and characterized in that at least one of the races and/or the contact surface of the rolling elements of one of the rows of rolling elements is (are) coated coated by a coating made of a chemical compound of lamellar structure.

According to a second aspect, another object of the invention is a lubricating composition for rolling bearing for blade roots characterized in that it comprises a lubricant and a chemical compound of lamellar structure.

According to a third aspect, another object of the invention is a use of a lubricating composition comprising a lubricant and a chemical compound of lamellar structure for lubricating a rolling bearing for blade roots.

According to a fourth aspect, one object of the invention is a process for manufacturing the rolling bearing for blade roots, characterized in that it comprises a step of depositing a coating made of a chemical compound of lamellar structure and a step of applying a lubricant.

DESCRIPTION OF THE FIGURES

FIG. 3 presents two microscopy images of the wear marks after a tribological test on:

Figure 1:
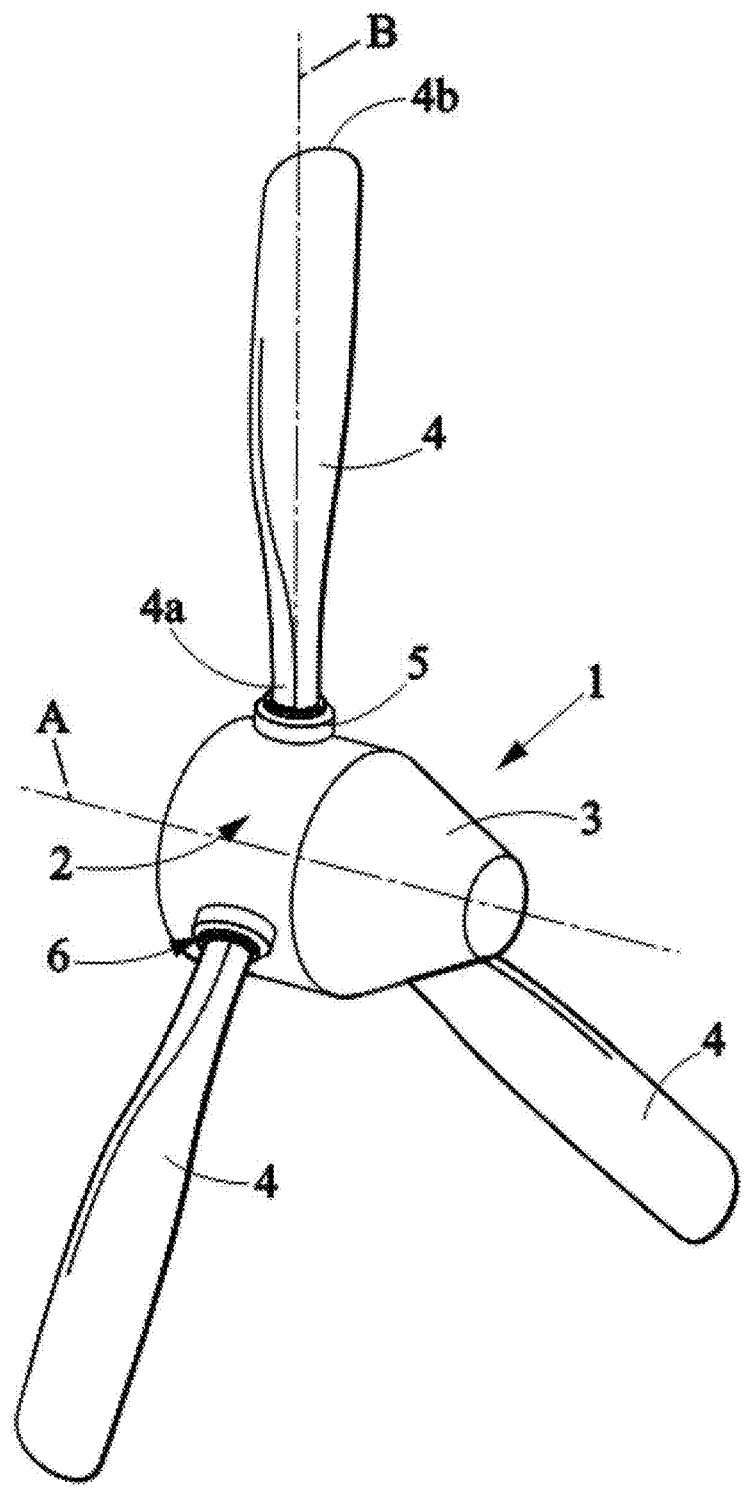
FIG. 1 is a perspective schematic diagram of a rotor.

the surface of a plate not coated with a coating made of $WS_2$ but that is lubricated (surface S1, at the top), and the surface of a plate coated with a coating made of $WS_2$ and lubricated (surface S2, at the bottom).

DETAILED DESCRIPTION OF THE INVENTION

According to a first aspect, the present invention relates to a rolling bearing for blade roots extending along a longitudinal direction between a proximal end and a distal end, the rolling bearing for blade roots comprising:

an outer ring having an inner surface and an outer surface opposite to the inner surface, the inner surface of the outer ring having an outer race, an inner ring having an inner surface and an outer surface opposite to the inner surface, the outer surface of the inner ring having an inner race, a single internal space being defined between the inner surface of the outer ring and the outer surface of the inner ring, the single internal space extending between a proximal end where it is closed off by a proximal sealing system between the outer ring and the inner ring and a distal end where it is closed off by a distal sealing system between the outer ring and the inner ring, said single internal space containing a lubricant, a row of rolling elements having a contact surface mounted in the single internal space, rolling on the outer and inner races, and characterized in that at least one of the races and/or the contact surface of the rolling elements is (are) coated with a coating made of a chemical compound of lamellar structure.

A chemical compound of lamellar structure is a compound of which the crystalline structure consists of two-dimensional sheets (along the x and y axes) stacked along the third dimension (along the z axis). The bonds between the atoms inside the sheets are strong, while those between the atoms of two sheets are weak.

The chemical compound of lamellar structure is selected from fluorine carbides, graphite, $MoS_2$, $WS_2$, $WSe_2$, NB, ZnO, ZnS and SnS, preferably selected from graphite, $MoS_2$ and $WS_2$, more preferentially the chemical compound of lamellar structure is $WS_2$.

$WS_2$ is favored since it is chemically inert, it is in particular compatible with solvents, fuels, oils, bases and acids. Furthermore, it is not intrinsically hard, thus, should particles of $WS_2$ become detached from the coating made of chemical compound of lamellar structure, these particles would not affect the correct functioning of the rolling bearing for blade roots. The difference in bond strength between the atoms gives to the chemical compound of lamellar structure a lubricating property.

Advantageously, this lubricating property is present over a broad range of temperatures. For example, $WS_2$ can lubricate a bearing from −188° C. to +538° C. The coating made of a chemical compound of lamellar structure, in particular made of $WS_2$, advantageously makes it possible to lubricate the rolling bearing for blade roots, in particular the rolling elements with respect to the coated race, over the entire range of temperatures to which the rolling bearing for blade roots is subjected.

The solid coating made of $WS_2$ remains lubricating up to a contact pressure of the order of 3 GPa. Thus, a coating made of a chemical compound of lamellar structure, in particular made of $WS_2$, advantageously makes it possible to lubricate the rolling bearing for blade roots, in particular the rolling elements with respect to the coated race, irrespective of the constraint to which said bearing is subjected during the use for which it is designed.

Furthermore, the coating made of a chemical compound of lamellar structure adheres strongly to the surface of the race on which it is present. The coating made of a chemical compound of lamellar structure does not therefore become detached despite the high contact pressure and the oscillating conditions to which the rolling bearing for blade roots is subjected.

According to one embodiment, the thickness of the coating is from 0.2 μm to 2 μm, in particular from 0.5 μm to 1.75 μm, more particularly from 0.8 μm to 1.5 μm.

According to one embodiment, the lubricant is a grease comprising a base oil and a thickener.

The base oil of a grease contributes to the lubricity of the grease, to its thermal resistance, to its load-bearing strength and, consequently, the service life thereof. A synthetic oil of ester, polyalphaolefin or perfluoropolyether type, used alone or as a mixture, is particularly suitable as base oil for the grease of the lubricant of the present invention. These synthetic oils are those customarily used in the field of greases and known to those skilled in the art.

The thickener imparts its structure to the grease by fixing the base oil, determines the behavior of the grease in terms of thermal resistance, load-bearing strength resistance and water resistance, its consistency and its flow capacities. It also helps to form the lubricating film. Depending on the grease used, the thickeners may be of soap-based or non-soap-based type. The soap-based thickeners used may be metal (lithium) soaps or complex metal (aluminum, lithium, calcium, sodium) soaps and the non-soap-based thickeners may be organic or inorganic compounds (bentonite, bentone, polyresin, silica, polyurea, etc.). Polyurea, a lithium complex metal soap and a sodium complex metal soap are particularly suitable as thickener for the grease of the lubricant of the present invention.

In particular, the grease comprises an ester-perfluoropolyether mixture and polyurea; polyalphaolefins and a lithium complex metal soap; an ester-polyalphaolefin mixture and a sodium complex metal soap; or a synthetic oil and a lithium complex metal soap. Preferably, the grease comprises a mixture of polyalphaolefins and lithium complex metal soap or a mixture of synthetic oil and complex metal soap.

The grease may also comprise additives such as anticorrosion additives, extreme pressure additives and antioxidants.

The range of operating temperatures of the grease stretches from a lower temperature limit to an upper temperature performance limit. The lower temperature limit is the lowest temperature at which the grease enables the rolling bearing to start moving without difficulty. Below this limit, the lubrication is insufficient and may lead to failures of the bearing. Above the upper temperature performance limit, the grease is degraded in an uncontrolled manner and its service life is no longer guaranteed.

The lower temperature limit of the grease of the lubricant according to the invention may be from −70° C. to −20° C., in particular from −60° C. to −30° C., more particularly from −55° C. to −40° C.

The upper temperature performance limit of the grease of the lubricant according to the invention may be greater than or equal to 170° C., in particular from 170° C. to 210° C., more particularly from 175° C. to 200° C.

Advantageously, these temperature ranges enable the lubricant to have a lubricating property that makes it possible to lubricate the rolling bearing for blade roots over the entire range of temperatures to which said rolling bearing is subjected.

According to one embodiment, the grease has a dropping point from 200° C. to 350° C., in particular from 220° C. to 300° C., more particularly from 240° C. to 285° C. as measured by the NF T 60-627 method.

According to the NF T 60-627 method, the dropping point corresponds to the temperature at which a heated sample of grease begins to flow through a standardized orifice.

Advantageously, the dropping point of the grease is greater than the maximum temperature of the range of temperatures to which the rolling bearing for blade roots is subjected. The grease of the lubricant according to the invention does not therefore liquefy within this temperature range and will not be easily projected outward from the rolling bearing for blade roots in which the lubricant is used, but on the contrary will make it possible to lubricate said rolling bearing at the high temperatures to which it may be subjected.

The NLGI grade, established by the National Lubricating Grease Institute, is a classification widely used for greases. It is measured by the ASTM D217 method. It makes it possible to classify greases into nine grades on the basis of their consistency.

A grease having an NLGI grade greater than 0, in particular from 1 to 5, more particularly from 2 to 3 as measured by the ASTM D217 method is particularly suitable for the lubricant according to the invention. Indeed, a grease having an NLGI grade within these ranges of values has the best ratio between the resistance to the stresses undergone and the friction generation of the surfaces in contact in the rolling bearing for blade roots, it therefore better withstands the stresses undergone by the lubricant and limits the risk of projection of said lubricant according to the invention outward from said bearing.

According to one embodiment, the base oil has a kinematic viscosity at 40° C. greater than or equal to 40 mm$^2$·s$^{-1}$, in particular from 45 mm$^2$·s$^{-1}$ to 250 mm$^2$·s$^{-1}$, more particularly from 50 mm$^2$·s$^{-1}$ to 220 mm$^2$·s$^{-1}$ as measured by the NF T 60-100 method.

The kinematic viscosity corresponds to the measure of a fluid's resistance to flow. As the kinematic viscosity varies with temperature, it is measured at 40° C., in accordance with the NF T 60-100 method.

Advantageously, a base oil having a kinematic viscosity within the above ranges enables the lubricant according to the invention to have a lubricating property such that surfaces in contact in the rolling bearing for blade roots do not rub too much, which promotes the service life of said rolling bearing.

The lubricant may additionally comprise the chemical compound of lamellar structure of the coating.

As explained above, in connection with the coating, the chemical compound of lamellar structure has a lubricating property over a wide temperature range. Advantageously, the combination of the lubricant and the chemical compound of lamellar structure enables the lubricant to have a lubricating property over the entire range of temperatures to which the rolling bearing for blade roots is subjected.

Without wishing to be tied to any one theory, the inventors believe that the chemical compound of lamellar structure included in the lubricant interacts with the coating made of chemical compound of lamellar structure in order to reform it, should said coating be damaged during the use of said rolling bearing for blade roots. Advantageously, this interaction increases the service life of the coating.

According to one embodiment, the content of chemical compound of lamellar structure in the lubricant is from 1% to 10% by weight, in particular from 2% to 7% by weight, more particularly still from 3% to 5% by weight relative to the weight of the grease.

Contents of chemical compound of lamellar structure outside of the ranges below may destabilize the lubricant according to the invention, that is to say make it lose its lubricating property.

In order to improve the lubrication of the rolling bearing for blade roots, the coating made of a chemical compound of lamellar structure may preferentially coat both races. In order to facilitate the deposition of the coating, said coating may, more preferentially, be deposited over the entire inner surface of the outer ring and/or over the entire outer surface of the inner ring. The contact surface of the rolling elements may also be coated with the coating made of a chemical compound of lamellar structure.

According to one embodiment, the surface of the race coated by the coating is rough.

The coating made of a chemical compound of lamellar structure adopts the shapes of the roughness of the surface on which it is applied. Advantageously, the roughness of the surface enables the formation of surface anfractuosities in which the lubricant and possible wear particles of the rolling bearing for blade roots or of said coating may be trapped. This surface roughness enables the retention of the lubricant in the contact area despite the oscillating conditions. This surface roughness also reduces the risk of the wear particles acting as abrasive particles affecting the functioning of the rolling bearing for blade roots. The surface roughness therefore increases the service life of the rolling bearing for blade roots.

According to one embodiment, the metallurgical characteristics of one of the surfaces of a race coated by the coating may be improved, in particular the residual stresses may be increased, thus increasing the service life of the rolling bearing for blade roots.

According to one embodiment, the material of the outer ring and the material of the inner ring are selected from rolling bearing steel grades, independently of one another, from 100Cr6, M50, M50NiL, nitrided 32CrMoV13, case-hardened 16NiCrMo13, in particular is M50NiL.

According to one embodiment, the material of the rolling elements is selected from M50, 100Cr6, $Si_3N_4$, in particular is M50.

The present invention also relates to a rolling bearing for blade roots extending along a longitudinal direction between a proximal end and a distal end, the rolling bearing allowing an oscillation of the root about an axis extending along the longitudinal direction relative to a housing, the rolling bearing for blade roots comprising:
  a single outer ring having an inner surface and an outer surface opposite to the inner surface, the inner surface of the outer ring having a proximal first outer race and a distal second outer race, the first and second outer races being offset relative to one another along the longitudinal direction,
  a first inner ring having an inner surface and an outer surface opposite to the inner surface, the outer surface of the first inner ring having a proximal first inner race and a distal seat, the first inner race and the seat being offset relative to one another along the longitudinal direction,
  a second inner ring having an inner surface and an outer surface opposite to the inner surface, the outer surface of the second inner ring having a distal second inner race, the second inner ring being fixed to the seat and being maintained axially in abutment against the first inner ring,
  a single internal space being defined between the inner surface of the outer ring and the outer surface of the first and second inner rings, the single internal space extending between a proximal end where it is closed off by a proximal sealing system between the outer ring and the first inner ring and a distal end where it is closed off by a distal sealing system between the outer ring and the second inner ring, said single internal space containing a lubricant,
  a proximal first row of rolling elements having a contact surface mounted in the single internal space, rolling on the proximal first outer and inner races and a distal second row of rolling elements having a contact surface mounted in the single internal space, rolling on the distal second outer and inner races, the first and second rows of rolling elements being spaced apart from one another along the longitudinal axis,
  the inner surface of the first inner ring comprising a shoulder for assembly to a blade root,
  the outer surface of the single outer ring comprising a shoulder for assembly to a housing,
and characterized in that at least one of the races and/or the contact surface of the rolling elements of one of the rows of rolling elements is (are) coated by a coating made of a chemical compound of lamellar structure.

The coating made of a chemical compound of lamellar structure and the lubricant of this particular rolling bearing for blade roots are as described above.

Figure 2:
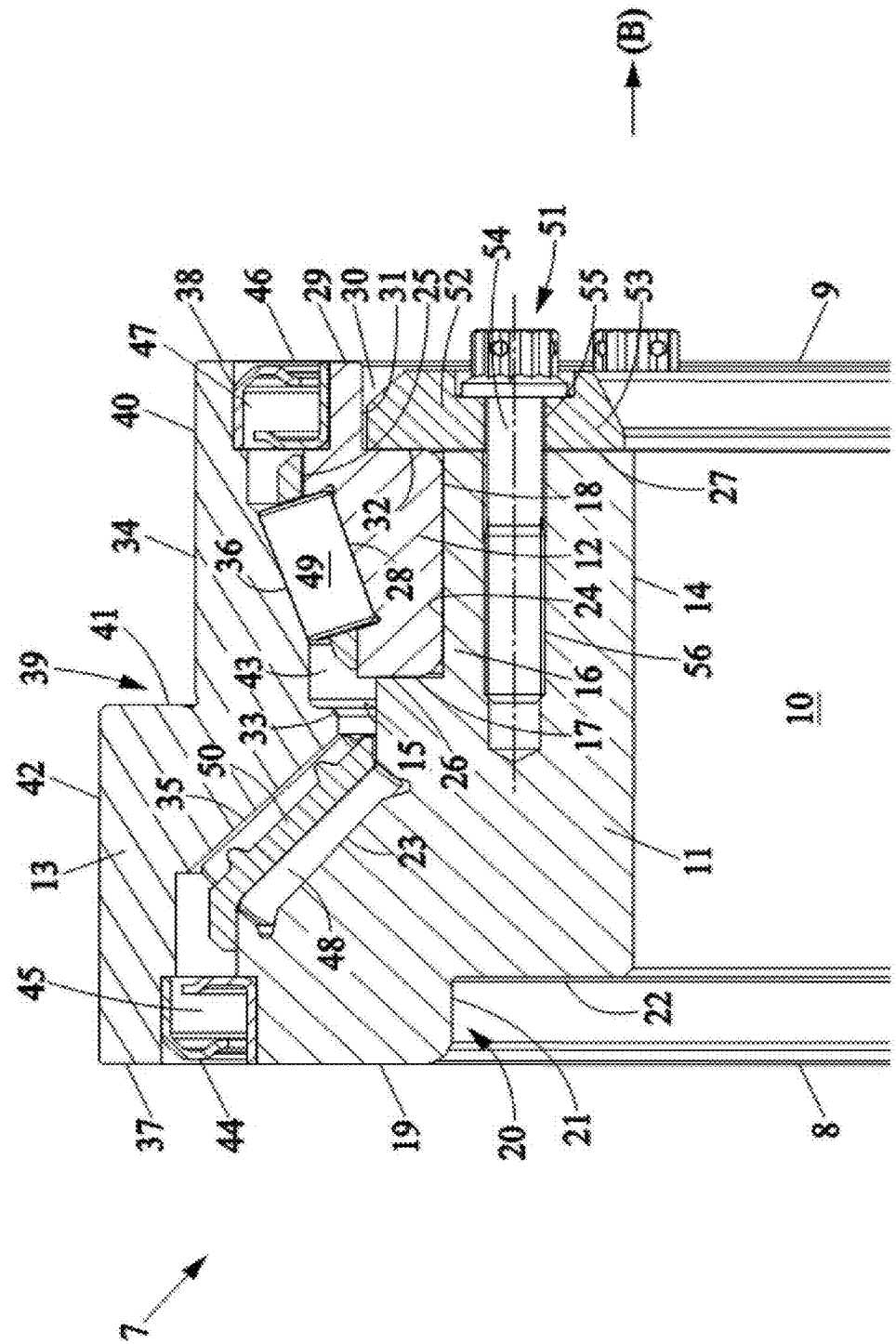
FIG. 2 is a cross-sectional view of one particular exemplary embodiment of a rolling bearing for blade roots.

A detailed account of this particular rolling bearing for blade roots, combined with reference to FIGS. 1 and 2, is presented hereinbelow.

FIG. 1 schematically represents, in perspective in three dimensions, an example of a rotating system 1 according to one exemplary embodiment of the invention. The rotating system 1 comprises a hub (not shown) of axis A about which a rotor 2 is rotatably mounted. The rotor 2 rotates relative to the hub about the axis A. The rotor 2 comprises a main body 3, for example rotationally symmetric about the axis A. The rotor 2 also comprises one or more blades 4 (in the example, three blades 4), each extending radially with respect to the hub. Each blade 4 extends along a longitudinal axis B. Since a blade may have a very complex shape, it is difficult to define very precisely the longitudinal axis B, except that corresponds to the main direction of the blade 4. Therefore, when it is stated that the blade 4 extends "radially", this does not necessarily imply that the axis B intersects the axis A or extends in a plane perpendicular to the axis A, but the general direction of the blade 4 is radial.

The blade 4 extends between one end, referred to as the blade root 4a, where it is assembled to the main body 3, and a free opposite end 4b. The blade 4 is mounted, at its root 4a, in a housing 5 attached to the main body 3. The blade 4 is oscillatably mounted in the housing 5 by means of a rolling bearing (described in detail below) mounted between the blade root 4a and the housing 5. The rolling bearing in question has a rolling bearing axis, and the oscillation of the blade 4 relative to the housing 5 is allowed with respect to this axis. The axis in question is clearly defined and extends substantially along the axis B. To be specific, it can be considered that the axis B corresponds to the axis of the rolling bearing and, consequently, B will be referred to as the axis of the bearing.

During operation, the blade 4 will rotate with respect to the housing 5 about the axis B, but a priori over an angular travel of less than 360°. On the other hand, the blade 4 will oscillate with respect to the housing 5 about the axis B by controlled back-and-forth movements, according to the forces transmitted by the blade to the surrounding fluid (air).

The housing 5 is any component that enables this use.

As explained above, the rolling bearing is consequently off-centered with respect to the axis A, and is consequently subjected to strong centrifugation about this axis A during the use of the rotating system 1.

The present invention is applicable to other bearings oscillating about a radial axis and centrifuged about an axial axis.

In what follows, the term "axial" refers to the axis B of this rolling bearing 7, parallel to the direction (B) represented. The term "proximal" refers to the proximity of a component to the axis A, whereas the term "distal" refers to the remoteness of a component from the axis A.

The rolling bearing 7 therefore comprises a proximal side 8 and a distal side 9, opposite to the proximal side 8.

The rolling bearing 7 defines an inner bore 10 in which the blade root 4 is to be mounted.

In what follows, the term "inner" is used to denote the proximity to the axis B, whereas the term "outer" is used to denote the remoteness from the axis B.

The rolling bearing 7 comprises a first inner ring 11, a second inner ring 12, and a single outer ring 13. The inner rings 11 and 12 are referred to in this way since they each have an inner race for rolling elements, and the outer ring 13 is referred to in this way since it has outer races for rolling elements, as will be explained in greater detail subsequently.

The first inner ring 11 comprises an inner surface 14 and an outer surface 15 opposite to the inner surface 14. The inner surface 14 is used for the mounting of the rolling bearing 7 on the blade root. The inner surface 14 has a minimum diameter $d_{shaft}$. The first inner ring 11 extends axially from the proximal side 8 in the direction of the distal side 9, over a large majority of the axial length of the rolling bearing 7.

In the distal half of the rolling bearing 7, the outer surface 15 defines a distal seat 16 for receiving the second inner ring 12. The distal seat 16 comprises an axial abutment surface 17 facing the distal side 9, and a cylindrical receiving surface 18 oriented towards the outside, and extending from the axial abutment surface 17.

In the proximal half of the rolling bearing 7, the outer surface 15 defines a proximal first race 23.

The first inner ring 11 comprises a proximal end surface 19. The inner surface 14 of the first inner ring 11 comprises a shoulder 20 for assembly to a blade root. The shoulder 20 comprises a cylindrical surface 21 extending from the proximal end surface 19 in the direction of the distal end, an axial abutment surface 22 facing the proximal side 8, and extending from the cylindrical surface 21 to the bore 10.

The first inner ring 11 comprises a distal end surface 27, opposite to the axial abutment surface 22 and facing the distal side 9.

The second inner ring 12 comprises an inner surface 24 and an outer surface 25 opposite to the inner surface 24. The inner surface 24 is used for mounting the second inner ring 12 in the seat 16 of the first inner ring by press fitting. The inner surface 24 therefore faces, being complementary to, the cylindrical receiving surface 18. The second inner ring 12 extends axially from a first axial abutment surface 26 facing the proximal side 8 in the direction of the distal side 9, over around a distal half of the axial length of the rolling bearing 7.

The outer surface 25 defines a distal second race 28.

The second inner ring 12 comprises a distal end surface 29. The inner surface 24 of the second inner ring 11 comprises a pre-loading shoulder 30. The shoulder 30 comprises a cylindrical surface 31 extending from the distal end surface 29 in the direction of the proximal end, an axial abutment surface 32 facing the distal side 9, and extending from the cylindrical surface 31 to the cylindrical receiving surface 18.

The outer ring 13 comprises an inner surface 33 and an outer surface 34 opposite to the inner surface 33. The outer surface 34 is used for mounting the rolling bearing 7 on the housing. The outer ring 13 extends axially from the proximal side 8 to the distal side 9, over the whole of the axial length of the rolling bearing 7.

In the proximal half of the rolling bearing 7, the inner surface 33 defines a proximal second race 35. In the distal half of the rolling bearing 7, the inner surface 33 defines a distal second race 36.

The outer ring 13 comprises a proximal end surface 37 and an opposite distal end surface 38. The outer surface 34 comprises a shoulder 39 for assembly to the housing. The shoulder 39 comprises a cylindrical surface 40 extending from the distal end surface 38 in the direction of the proximal end, an axial abutment surface 41 facing the distal side 9, and extending from the cylindrical surface 40 to a second cylindrical surface 42. The second cylindrical surface 42 extends from the axial abutment surface 41 to the proximal end surface 37.

A single internal space 43 is defined between the inner surface 33 of the outer ring 13 and the outer surface 15, 25 of the first and second inner rings 11, 12, the single internal space 43 extending between a proximal end 44 where it is closed off by a proximal sealing system 45 between the outer ring 13 and the first inner ring 11 and a distal end 46 where it is closed off by a distal sealing system 47 between the outer ring 13 and the second inner ring 12.

In the single internal space 43, the proximal first outer and inner races 23, 35 face each other, and the distal second outer and inner races 28, 36 face each other.

A proximal first row of rolling elements 48 having a contact surface is mounted in the single internal space, rolling on the proximal first outer and inner races 23, 35. A distal second row of rolling elements 49 having a contact surface is mounted in the single internal space, rolling on the distal second outer and inner races 28, 36. The first and second rows of rolling elements 48, 49 are spaced apart from one another along the longitudinal axis B.

The rolling elements of one and the same row are, where appropriate, spaced apart from one another by a cage 50, as represented in FIG. 2 for the proximal row.

The rolling bearing 7 comprises a loading system 51 suitable for maintaining the second inner ring 12 axially in abutment against the first inner ring 11.

The loading system 51 comprises an annular plate 52 having a rolling bearing surface 53 in contact with the second inner ring 12 and putting strain on the second inner ring 12 in the axial direction, the annular plate 52 being held firmly attached to the first inner ring 11 by screwing with the aid of a screw 54. More specifically, the plate 52 is screwed onto the inner ring 51 by screws passing through bores 55 of the plate 52 and bores 56 of the first inner ring 11 lined up with the bores 55. The rolling bearing surface 53 bears against the axial abutment surface 32, thus putting strain on the second inner ring 12 in the direction of the proximal side, these tightening stresses being located at the contact between the axial abutment surface 17 of the first inner ring 11 and the axial abutment surface 26 of the second inner ring 12. The screws are tightened until a loading force $F_{preload}$ is applied.

The shoulder 39 for assembly to the housing, in particular the axial abutment surface 41 thereof, provided on the outer surface 34 of the single outer ring 13 is positioned axially (along the direction (B)) between the first and second rows of rolling elements, that is to say substantially in the middle, axially, of the length of the rolling bearing 7.

The shoulder 20 for assembly to the blade root, provided on the inner surface 14 of the first inner ring 12 is positioned more proximally than the first proximal row 48 of rolling elements.

Thus, the axial stresses undergone by the rolling bearing are essentially taken up by the first proximal row 48 of rolling elements.

In the example above, the rolling elements of the two rows of rolling elements have the same type of geometry.

Instead of rollers, use could also be made of other types of rolling elements, for example balls.

In order to improve the lubrication of the rolling bearing for blade roots 7 described above, the coating made of a chemical compound of lamellar structure may coat at least two races, preferably at least three races, more preferentially all the races. In order to facilitate the deposition of the coating, said coating may, more preferentially, be deposited on the whole of the inner surface of the single outer ring, on the whole of the outer surface of the first inner ring and/or on the whole of the outer surface of the second outer ring. The contact surface of the rolling elements of the proximal first row and/or the contact surface of the distal second row may also be coated with the coating made of a chemical compound of lamellar structure.

According to a second aspect, the present invention also relates to a lubricating composition for a rolling bearing for blade roots characterized in that it comprises a lubricant and a chemical compound of lamellar structure.

The lubricant is as described above in the section devoted to the rolling bearing for blade roots.

The chemical compound of lamellar structure is as described above in the section devoted to the rolling bearing for blade roots.

As explained above, in connection with the coating of the rolling bearing for blade roots, the chemical compound of lamellar structure has a lubricating property over a wide temperature range. Advantageously, the combination of the lubricant and the chemical compound of lamellar structure enables the lubricating composition to have a lubricating property over the entire range of temperatures to which a rolling bearing for blade roots is subjected.

According to one embodiment, the content of chemical compound of lamellar structure in the lubricating composition is from 1% to 10% by weight, in particular from 2% to 7% by weight, more particularly still from 3% to 5% by weight relative to the weight of the grease.

Contents of chemical compound of lamellar structure outside of the ranges below may destabilize the lubricating composition according to the invention, that is to say make it lose its lubricating property.

According to a third aspect, the present invention relates to the use of a lubricating composition comprising a lubricant and a chemical compound of lamellar structure in order to lubricate a rolling bearing for blade roots.

The lubricant and the chemical compound of lamellar structure are as described above in the section devoted to the lubricating composition.

As indicated above, in the section devoted to the lubricating composition, the combination of the lubricant and the chemical compound of lamellar structure enables the lubricating composition to have a lubricating property irrespective of the strain and the temperatures to which a rolling bearing for blade roots is subjected. This lubricating composition may therefore be used to lubricate a rolling bearing for blade roots.

In particular, the lubricating composition may be used to lubricate the rolling bearing for blade roots that is the object of the invention.

Without wishing to be tied to any one theory, the inventors believe that the chemical compound of lamellar structure included in the lubricating composition interacts with the coating made of chemical compound of lamellar structure in order to reform it, should said coating be damaged during the use of the rolling bearing for blade roots. Advantageously, this interaction increases the service life of the coating.

Very particularly, the lubricating composition may be used to lubricate the rolling elements with respect to the race of the rolling bearing for blade roots.

The invention also relates to a process for manufacturing the rolling bearing for blade roots described above, characterized in that it comprises the following steps:
a) deposition of a coating made of a chemical compound of lamellar structure on one of the races and/or on the contact surface of the rolling elements, and
b) application of a lubricant in the single internal space.

The coating made of a chemical compound of lamellar structure and the lubricant of this particular rolling bearing for blade roots are as described in the section devoted to the bearing.

The coating made of a chemical compound of lamellar structure may be deposited by any surface deposition technique known to person skilled in the art. In particular the coating may be deposited by propulsion in a conditioned gas of the chemical compound of lamellar structure on the surface to be coated. Such a technique is highly advantageous since it enables a deposition at low temperature, at high speed, without supply of heat or polymerization. It is therefore economical and rapid.

The lubricant is applied in the single internal space of the rolling bearing by any lubricant deposition technique known to a person skilled in the art. The lubricant may be applied manually, by a grease gun or by an automatic lubricator. In particular, the lubricant may be applied to the coating made of a chemical compound of lamellar structure deposited on one of the races and/or on the contact surface of the rolling elements.

According to one embodiment, the process may additionally comprise a preliminary step of treating the surface having the race on which the coating is deposited during step a).

This preliminary step of treating the surface increases the roughness of said surface. It may be carried out by any technique known to a person skilled in the art that makes it possible to increase the roughness of the surface. In particular, this preliminary step is carried out by shot peening. Advantageously, shot peening also improves the metallurgical characteristics, in particular through the increase in the residual stresses, of the surface treated, thus improving the service life of the rolling bearing for blade roots.

According to one embodiment, the process may comprise a tribofinishing step in order to regulate the roughness obtained during the preliminary surface treatment step.

EXAMPLES

Example 1

Tribological Test of a Surface Coated with a Coating Made of a Chemical Compound of Lamellar Structure The surface, S1, of a plate (made of M50NiL) is subjected to a tribological test using a ball (made of M50) according to the parameters of table 1 below.

In order to study the impact of the $WS_2$ coating, the surface, S2, of a plate (made of M50NiL) coated with a $WS_2$ coating is subjected to the same test.

After the tests, the state of the surfaces S1 and S2 is analyzed.

TABLE 1

Tribological test parameters

| Parameter | Value |
|---|---|
| Maximum contact pressure | 3.5 GPa |
| Oscillation distance of the plate | 1.5 mm |
| Frequency of rotation of the ball | 10 Hz |
| Duration | 2 h |
| Temperature | Ambient: 20° C. |
| Lubricant | Thickener: lithium complex |
| | Base oil: polyalphaolefin |
| | Dropping point: >300° C. |

Figure 3:
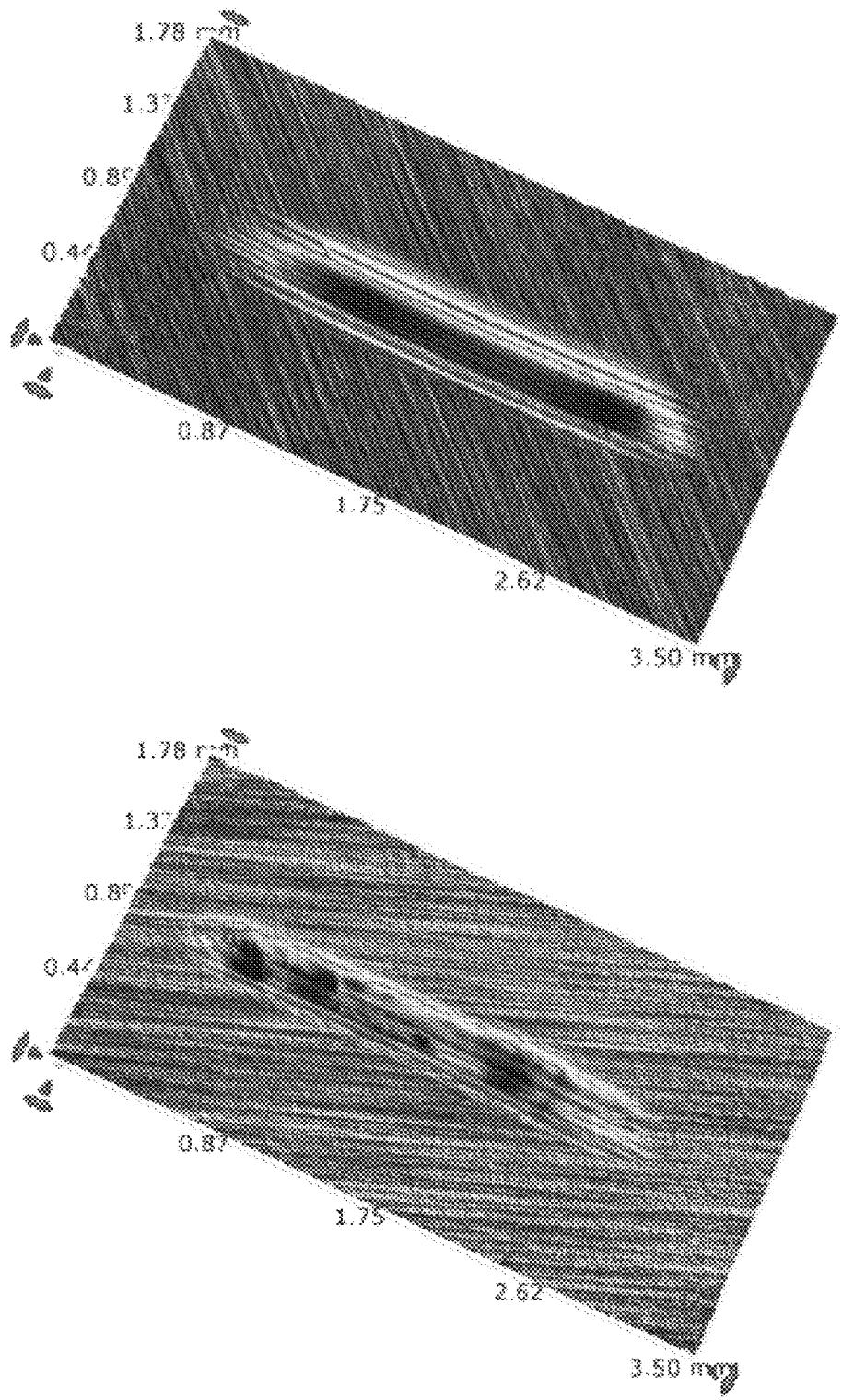

As illustrated in FIG. 3, the wear mark on the surface S1 is larger and deeper than that on the surface S2. The $WS_2$ coating therefore makes it possible to better lubricate the contact area between the surface and the ball. The $WS_2$ coating therefore makes it possible to lengthen the service life of a rolling bearing for blade roots.

Example 2

Tribological Test of a Surface Treated by Shot Peening Coated with a Coating Made of a Chemical Compound of Lamellar Structure The surface, S3, of a plate (made of M50NiL) treated by shot peening then coated by a $WS_2$ coating is subjected to a tribological test using a ball (made of M50) according to the parameters of table 1 above.

After the test, the state of the surfaces S3 and S2 is analyzed.

The wear mark on the surface S3 is smaller and shallower than that on the surface S2 from Example 1. The shot peening treatment combined with the $WS_2$ coating therefore makes it possible to lubricate the contact area between the surface and the ball better than the $WS_2$ coating alone. This combination therefore makes it possible to lengthen the service life of a rolling bearing for blade roots.

The invention claimed is:

1. A rolling bearing for blade roots (7) extending along a longitudinal direction between a proximal end and a distal end, the rolling bearing comprising:
    an outer ring (13) having an inner surface (33) and an outer surface (34) opposite to the inner surface (33), the inner surface (33) of the outer ring (13) having an outer race;
    an inner ring (11, 12) having an inner surface (14, 24) and an outer surface (15, 25) opposite to the inner surface (14, 24), the outer surface (15, 25) of the inner ring (11, 12) having an inner race;
    a single internal space (43) being defined between the inner surface (33) of the outer ring (13) and the outer surface (15, 25) of the inner ring (11, 12), the single internal space (43) extending between a proximal end (44) where said internal space (43) is closed off by a proximal sealing system (45) between the outer ring (13) and the inner ring (11, 12) and a distal end (46) where said internal space (43) is closed off by a distal sealing system (47) between the outer ring (13) and the inner ring (11, 12), said single internal space (43) containing a lubricant; and
    a row of rolling elements (48, 49) having a contact surface mounted in the single internal space (43), rolling on the outer and inner races,
    wherein at least one of the races and/or the contact surface of the rolling elements is (are) coated with a coating made of a chemical compound of lamellar structure selected from the group consisting of fluorine carbides, WS2, WSe2, NB, ZnO, ZnS and SnS, and
    wherein said coating remains lubricating up to a contact of the order of 3GPa.

2. The rolling bearing for blade roots (7) according to claim 1, wherein the chemical compound of lamellar structure is $WS_2$.

3. The rolling bearing for blade roots (7) according to claim 1, wherein the lubricant is a grease comprising a base oil and a thickener,
    the base oil being selected from the group consisting of ester-perfluoropolyether mixture, polyalphaolefins, an ester-polyalphaolefin mixture and a synthetic compound, and
    the thickener being selected from the group consisting of polyurea, a lithium complex metal soap, and a sodium complex metal soap.

4. The rolling bearing for blade roots (7) according to claim 3, wherein the grease has an operating temperature range having a lower temperature limit from −70° C. to −20° C., and
    an upper temperature performance limit greater than or equal to 170° C.

5. The rolling bearing for blade roots (7) according to claim 3, wherein the lubricant additionally comprises the chemical compound of lamellar structure of the coating.

6. The rolling bearing for blade roots (7) according to claim 5, wherein the content of chemical compound of lamellar structure is from 1% to 10% by weight relative to the weight of the grease.

7. The rolling bearing for blade roots (7) according to claim 1,
    wherein the material of the outer ring (13) is selected from the group consisting of 100Cr6, M50, M50NiL, nitrided 32CrMoV13, and case-hardened 16NiCrMo13, and
    wherein the material of the inner ring (11, 12) is selected from the group consisting of 100Cr6, M50, M50NiL, nitrided 32CrMoV13, and case-hardened 16NiCrMo13.

8. The rolling bearing for blade roots (7) according to claim 1, wherein the material of the rolling elements is selected from the group consisting of M50, 100Cr6, and $Si_3N_4$.

9. A process for manufacturing a rolling bearing for blade roots (7) as defined in claim 1, comprising the steps of:
    depositing a coating made of a chemical compound of lamellar structure on at least one of the races and/or on the contact surface of the rolling elements; and
    applying a lubricant in the single internal space (43).

10. The process according to claim 9, additionally comprising a preliminary step of treating a surface having a race on which the coating is deposited during said depositing step.

11. A lubricating composition for rolling bearing for blade roots (7), comprising:
    a lubricant; and
    a chemical compound of lamellar structure selected from the group consisting of fluorine carbides, $WS_2$, $WSe_2$, NB, ZnO, ZnS and SnS, wherein the lubricating composition remains lubricating up to a contact of the order of 3GPa.

12. A rolling bearing for blade roots (7) extending along a longitudinal direction between a proximal end and a distal end, the rolling bearing allowing an oscillation of the root about an axis extending along the longitudinal direction relative to a housing (5), the rolling bearing comprising:
- a single outer ring (13) having an inner surface (33) and an outer surface (34) opposite to the inner surface (33), the inner surface (33) of the outer ring (13) having a proximal first outer race (35) and a distal second outer race (36), the first and second outer races being offset relative to one another along the longitudinal direction;
- a first inner ring (11) having an inner surface (14) and an outer surface (15) opposite to the inner surface (14), the outer surface (15) of the first inner ring (11) having a proximal first inner race (23) and a distal seat (16), the first inner race and the seat being offset relative to one another along the longitudinal direction;
- a second inner ring (12) having an inner surface (24) and an outer surface (25) opposite to the inner surface (24), the outer surface (25) of the second inner ring (12) having a distal second inner race (28), the second inner ring (12) being fixed to the seat (16) and being maintained axially in abutment against the first inner ring (11);
- a single internal space (43) being defined between the inner surface (33) of the outer ring (13) and the outer surface (15, 25) of the first and second inner rings, the single internal space (43) extending between a proximal end (44) where said internal space (43) is closed off by a proximal sealing system (45) between the outer ring (13) and the first inner ring (11) and a distal end (46) where said internal space (43) is closed off by a distal sealing system (47) between the outer ring (13) and the second inner ring (12), said single internal space (43) containing a lubricant; and
- a proximal first row of rolling elements (48) having a contact surface mounted in the single internal space (43), rolling on the proximal first outer and inner races (23, 35) and a distal second row of rolling elements (49) having a contact surface mounted in the single internal space (43), rolling on the distal second outer and inner races (28, 36), the first and second rows of rolling elements (48, 49) being spaced apart from one another along the longitudinal axis,
- the inner surface (14) of the first inner ring (11) comprising a shoulder (20) for assembly to a blade root (4a), and
- the outer surface (34) of the single outer ring (13) comprising a shoulder (20) for assembly to a housing,
- wherein at least one of the races and/or the contact surface of the rolling elements of one of the rows of rolling elements is (are) coated by a coating made of a chemical compound of lamellar structure selected from the group consisting of fluorine carbides, $WS_2$, $WSe_2$, NB, ZnO, ZnS and SnS, and
- wherein said coating remains lubricating up to a contact of the order of 3GPa.

13. The rolling bearing for blade roots (7) according to claim 12, wherein the chemical compound of lamellar structure is $WS_2$.

14. The rolling bearing for blade roots (7) according to claim 12, wherein the lubricant is a grease comprising a base oil and a thickener,
- the base oil being selected from the group consisting of an ester-perfluoropolyether mixture, polyalphaolefins, an ester-polyalphaolefin mixture and a synthetic compound, and
- the thickener being selected from the group consisting of polyurea, a lithium complex metal soap, and a sodium complex metal soap.

15. The rolling bearing for blade roots (7) according to claim 14, wherein the grease has an operating temperature range having a lower temperature limit from −70° C. to −20° C., and
- an upper temperature performance limit greater than or equal to 170° C.

16. The rolling bearing for blade roots (7) according to claim 14, wherein the lubricant additionally comprises the chemical compound of lamellar structure of the coating.

17. The rolling bearing for blade roots (7) according to claim 12, wherein the material of the rolling elements is selected from the group consisting of M50, 100Cr6, and $Si_3N_4$.

* * * * *